United States Patent

Hayashi et al.

[11] Patent Number: 5,983,107
[45] Date of Patent: Nov. 9, 1999

[54] MOBILE RADIO COMMUNICATIONS SYSTEM

[75] Inventors: Masato Hayashi, Kawasaki; Mikiya Namura, Yokohama; Tsutomu Kusaki, Yokohama; Koichi Tanigawa, Yokohama, all of Japan

[73] Assignee: Hitachi, Ltd., Tokyo, Japan

[21] Appl. No.: 08/833,706

[22] Filed: Apr. 9, 1997

[30] Foreign Application Priority Data

Apr. 11, 1996 [JP] Japan .................................. 8-089148

[51] Int. Cl.$^6$ ...................................................... H04B 1/00
[52] U.S. Cl. ...................... 455/446; 455/518; 455/445; 455/560
[58] Field of Search ........................... 455/422, 444, 455/445, 449, 453, 518, 519, 31.2, 524, 525, 31.3, 32.1, 433, 435, 560, 426, 561; 340/825.47, 825.52, 825.44

[56] References Cited

U.S. PATENT DOCUMENTS

| | | | |
|---|---|---|---|
| 4,427,980 | 1/1984 | Fennell | 340/825.44 |
| 5,557,657 | 9/1996 | Barnett | 455/444 |
| 5,797,100 | 8/1998 | Dettner | 455/422 |

*Primary Examiner*—Thanh Cong Le
*Assistant Examiner*—Makoto Aoki
*Attorney, Agent, or Firm*—Antonelli, Terry, Stout & Kraus, LLP

[57] ABSTRACT

In a mobile radio communication system of a multi-layer cell structure for covering service areas in layers with cells of different sizes, an enquiry originating mobile terminal transmits enquiry information in an enquiry frame to the N-th layer exchange through the N-th layer base station. The exchange discriminates a kind of the enquiry frame at processing, selects at processing, a minimum cell for covering a distribution area or a minimum number of cells which can cover the distribution area from the state of geographical distribution of the enquiry destinations, fills the numbers of the base stations for forming these cells and the numbers of the exchanges for covering these base stations in the enquiry frame, and transmits this enquiry frame to the corresponding exchange. The exchange checks the numbers of the base stations of the enquiry frame and transmits the enquiry frame to the corresponding base stations. The base stations transmit the received enquiry frame directly to the mobile terminals of the destinations.

25 Claims, 9 Drawing Sheets

| KIND OF FRAME (701) | IDENTIFICATION BIT (702) | CONTENTS (703) |
|---|---|---|
| ⋮ | ⋮ 705 | ⋮ |
| ENQUIRY (704) | 0001 | ASSIGNED DESTINATION |
| | 0010 | KEY WORD / TITLE |
| | 0011 | GLOBAL COMMUNICATION |
| ⋮ | ⋮ 707 | ⋮ |

| NUMBER OF DESTINATIONS (800) | DESTINATION ADDRESS 1 (801) | DESTINATION ADDRESS 2 (802) | DESTINATION ADDRESS 3 (803) | ... | DESTINATION ADDRESS p (804) |
|---|---|---|---|---|---|

603

| LAYER NUMBER (805) | EXCHANGE NUMBER (806) | BASE STATION NUMBER (807) |
|---|---|---|

FIG.9

| PS-ID | POSITION ADDRESS | | | KEY WORD /TITLE |
|---|---|---|---|---|
| | LAYER NUMBER | EXCHANGE NUMBER | BASE STATION NUMBER | |
| 3822355 | 1 | 5 | 10 | |
| | 2 | 1 | 1 | |
| | 3 | 18 | 7 | |
| | ... | ... | ... | |
| | M | 12 | 21 | |
| 4189465 | 1 | 17 | 5 | |
| | 2 | 1 | 1 | |
| | 3 | 6 | 14 | |
| | ... | ... | ... | |
| | M | 31 | 7 | |
| ⋮ | ⋮ | ⋮ | ⋮ | ⋮ |
| 1234698 | 1 | 3 | 19 | |
| | 2 | 1 | 1 | |
| | 3 | 4 | 8 | |
| | ... | ... | ... | |
| | M | 56 | 13 | |
| ⋮ | ⋮ | ⋮ | ⋮ | ⋮ |
| 7029021 | 1 | 11 | 1 | |
| | 2 | 1 | 1 | |
| | 3 | 2 | 3 | |
| | ... | ... | ... | |
| | M | 25 | 4 | |

FIG.10

| PS-ID | BASE STATION NUMBER | KIND OF TERMINAL | KEY WORD / TITLE |
|---|---|---|---|
| 3454703 | 11 | DATA TERMINAL | |
| 5677301 | 2 | VOICE TERMINAL | |
| ⋮ | ⋮ | ⋮ | ⋮ |
| 3867001 | 7 | DATA TERMINAL | |

MOBILE RADIO COMMUNICATIONS SYSTEM

BACKGROUND OF THE INVENTION

The present invention relates to a mobile communication system for carrying out radio communications with personal stations, and relates more particularly to a selection of a cell to be formed by a base station when radio communications are carried out between a mobile terminal station and a base station in a radio communication system of a multi-layer cell structure.

At present, in a land mobile communication system, there exist two kinds of size of a cell to be formed by a base station; a macro cell in a cellular car telephone system and a micro cell in a personal handy phone system. Further, there is a trend that a service area is going to be structured with pico cells for servicing indoors and at underground shopping centers. In the above-described systems, a cell selection is being implemented based on the following standard.

(1) When wave receiving intensity is deteriorated or when a fading generated is large due to a geographical condition of buildings, a cell of satisfactory circuit quality is selected at the time of a circuit connection, to thereby prevent a deterioration of service quality.

(2) In the area where a traffic density is high and a large number of channels are required such as in the center of the town, a cell of a smaller radius which has a potential of an increase in the system capacity is selected, to thereby cover a large capacity.

When one terminal is going to carry out communications with a plurality of mobile terminals in a mobile radio communication system of the structure as described above, in the state that the mobile terminals to be communicated with are widely distributed, there arise the following problems at the time of carrying out the communications through a cell that is determined based on the above-described standard.

(1) There is a possibility that a plurality of cells are required in order to cover all the mobile terminals to be communicated with that are distributed over a wide range. Particularly, when a distance between the mobile terminals to be communicated with is large, one cell is required for each one mobile terminal to be communicated with, so that it becomes necessary to carry out sequential communications with base stations by the number of the mobile terminals to be communicated with, which results in a long communication time.

(2) There is a risk of an occurrence of a capacity shortage of a cell when the cell covers an area of high distribution density with a large variation of distribution density within the same distribution range, such as, for example, when a town center is included in the distribution range of the plurality of terminals to be communicated with.

(3) Further, since the distribution density is different for each cell, there arises an imbalance in the processing load applied to each base station and each exchange respectively. A base station and an exchange applied with heavier processing load become a bottleneck because of this imbalance, with a result that the communication time becomes longer than expected and that this gives a large influence to other communication services such as, for example, an increase in the probability of call loss and an increase in the processing time.

SUMMARY OF THE INVENTION

In order to eliminate the above-described problems, the present invention is characterized by a mobile radio communication system in which a cell is selected based on positions of a plurality of mobile terminals when one terminal carries out one-to-N communications to achieve communications with the plurality of mobile terminals, and by an exchange to be used for the mobile radio communication system, in a mobile communication system for allowing mobile terminals to communicate with base stations through a digital radio circuit based on a multi-layer cell communication system in which cells of different service areas are structured in layers and service areas covered by cells of the same size are handled in the same layer.

Further, the present invention is characterized by a mobile radio communication system in which a cell is selected based on the number of mobile terminals to be communicated with when one terminal carries out one-to-N communications for achieving communications with a plurality of mobile terminals, and by an exchange to be used for the mobile radio communication system, in a mobile communication system for allowing mobile terminals to communicate with base stations through a digital radio circuit based on a multi-layer cell communication system in which cells of different service areas are structured in layers and service areas covered by cells of the same size are handled in the same layer.

Further, the present invention is characterized by a mobile radio communication system in which a minimum cell that can cover the distribution area of mobile terminals to be communicated with is selected or a minimum number of cells that can cover the distribution area are selected, in the system that includes a unit for allowing an exchange to which one terminal belongs to specify positions of other mobile terminals to be communicated with from identification IDs of these mobile terminals, a unit for allowing an exchange to which a communication originating terminal belongs to specify identification IDs of other mobile terminals to be communicated with that have the same information as the information for limiting the mobile terminals to be communicated with, a unit for determining a cell of communication destinations from the state of distribution of mobile terminals to be communicated with, and a unit for advising a determined-cell controlling exchange of a base-station number of a base station in which mobile terminals to be communicated with are located.

Further, the present invention is characterized by a mobile radio communication system in which the exchange includes, in addition to the above-described unit for the exchange, a unit for specifying positions of mobile terminals to be communicated with and for estimating distribution density of the mobile terminals to be communicated with, so that smaller cells are selected for an area of high distribution density within a distribution range of the mobile terminals to be communicated with.

According to the present invention, when mobile terminals to be communicated with are not clear or no known, it is possible to make an enquiry in short time by selecting a minimum cell which can cover a distribution area or a minimum number of cells that can cover a distribution area, based on the status of geographical distribution of the mobile terminals to be communicated with, by utilizing a multi-address calling of radio communications. Further, the number of base stations and exchanges relating to the communications can be restricted, so that the traffic quantity relating to the transmission processing to the public network can be restricted.

Further, since a cell is selected by taking into account the distribution density of the mobile terminals to be communicated with, an overcrowding to a specific exchange can be avoided. Furthermore, since the distribution density is also taken into account, the communication processing load imposed onto related exchanges can be dispersed uniformly, which further can restrict affecting bad influence, such as, for example, an increase in the probability of call loss and an increase in the processing time, to other communication services.

DESCRIPTION OF THE PREFERRED EMBODIMENTS

Embodiments of the present invention will be explained below with reference to drawings based on an enquiry in one-to-N communications.

Figure 1:
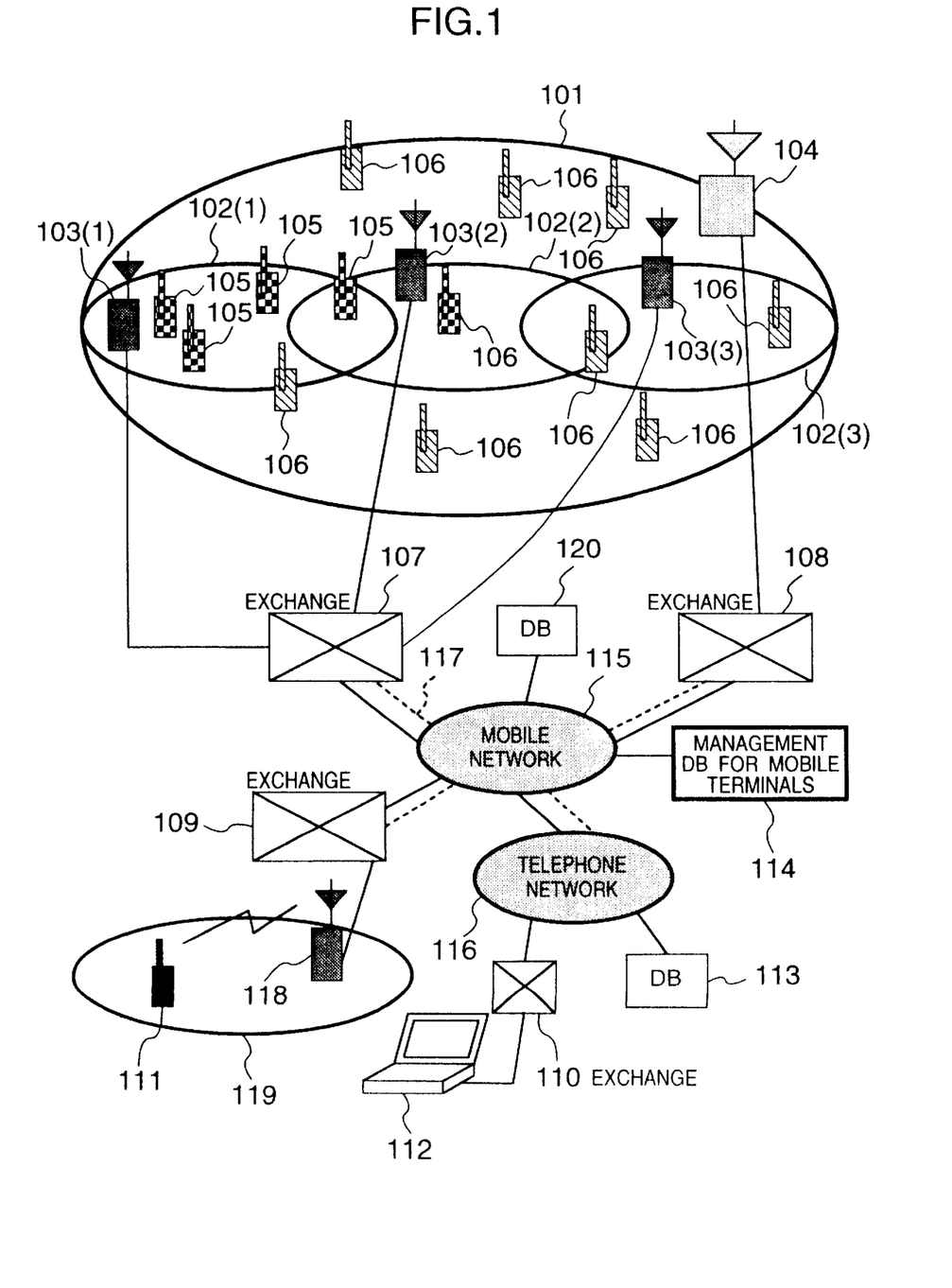
FIG. 1 is a configuration diagram for showing a mobile radio communication system of a multi-layer structure.

FIG. 1 shows a configuration of a mobile radio communication system according to the present invention. In FIG. 1, 101 denotes a cell for structuring an (N+1)-th layer, and 102 (1) to (3) and 119 denote cells for structuring an N-th layer. All the cells within the layer share the frequency either completely or partially. 103 (1) to 103 (3) and 118 denote base stations for forming the cells of the N-th layer. 104 shows a base station for forming the cell of the (N+1)-th layer, and this base station 104 controls a radio interface for a mobile terminal to carry out communications. 105 and 106 denote mobile terminals which become certain enquiry destinations, 107 and 109 denote exchanges of the N-th layer, and 108 denotes an exchange of the (N+1)-th layer. 110 denotes an exchange connected to a telephone network 116. 111 and 112 denote (mobile) terminals for carrying out an enquiry. 114 denotes a management DB (Data Base) for mobile terminals for managing the positions of mobile terminals in a mobile network 115 and for managing key word/title of information owned by the mobile terminals. 113 and 120 denote data bases for realizing other services. A broken line 117 denotes a common signal line and the common signal line 117 is used for exchanging control signals between exchanges, between an exchange and a public network and between public networks, respectively.

The outline of the system operation according to the present invention in the mobile radio communication system having the above-described structure will be explained below.

A first embodiment is a case of an enquiry where mobile terminals of enquiry destinations are known. Description will be made of a system operation according to the present invention for the case where either the mobile terminal 111 or the terminal 112 belonging to the N-th layer cell makes an enquiry to either the mobile terminals 105 or the mobile terminals 106 in FIG. 1. When the mobile terminal 111 makes an enquiry to the group of mobile terminals 105, the mobile terminal 111 assigns terminal identification IDs of the mobile terminals 105 of the destinations in an enquiry frame (to be described later) and transmits the enquiry frame through the base station 118 to the exchange 109 to which the base station 118 is connected. The exchange 109 checks the terminal identification IDs of the enquiry destinations of the enquiry frame, checks that the mobile terminals 105 of the enquiry destinations are not included in the layer under its control, and makes an access to the management DB 114 for mobile terminals and checks the positions of the mobile terminals 105. As a result, the exchange 109 recognizes that the group of mobile terminals 105 of the enquiry destinations are in the state of distribution that can be covered by one cell of the N-th layer cell 102 (1), and adds the number of the base station 103 (1) of the N-th layer cell 102 (1), the number of the exchange 107 and the number of the cell layer to the enquiry frame in addition to the enquiry frame destination, and transmits the enquiry frame to the mobile network 115. The enquiry frame is transmitted from the mobile network 115 to the exchange 107. The exchange 107 checks the base station number of the destination of the enquiry frame, and transmits the enquiry frame to the base station 103 (1), so that the contents of the enquiry are transferred to the mobile terminals 105 of the enquiry destinations.

For the mobile terminals 106 of the enquiry destinations, the exchange 109 makes a similar access to the management DB 114 for mobile terminals to check the positions of the mobile terminals 106 and selects a minimum cell which covers the distribution area from the state of distribution of the mobile terminals 106. In the present embodiment, the (N+1)-th layer cell is selected for the mobile terminals 106. The base station number of the (N+1)-th layer base station 104 and the exchange number of the (N+1)-th layer exchange 108 are filled in the enquiry frame, and the enquiry frame is transmitted to the exchange 108, so that an enquiry is made from the base station 104 to the mobile terminals 106.

When both the group of mobile terminals of the enquiry destinations and the enquiry originating terminal are under the control of the same exchange, a destination cell is selected by referring to the management table for mobile terminals (to be described later) which is under the control of the exchange and the enquiry frame is transmitted to the destination base station by return from the exchange.

When an enquiry originating terminal, such as the terminal 112, is connected to the telephone network 116 through the exchange 110, the exchange 110 which has received the enquiry makes an access to the management DB 114 for mobile terminals to check the positions of the destination terminal IDs, selects a minimum cell which covers the distribution area from the geographical distribution state and executes an enquiry operation similar to that described above.

According to the first embodiment, it is possible to make an enquiry in short time by selecting a minimum cell or a minimum number of cells that can cover a distribution area from the state of geographical distribution of the enquiry destinations, by utilizing the multi-address calling of radio communications. Further, the number of base stations and exchanges relating to the communication can be restricted, so that the traffic quantity relating to the transmission processing to the public network can be restricted.

A second embodiment is a case where mobile terminals of the enquiry destinations are unknown. The operation of making an enquiry by key word/title according to the present invention will be explained below. Basically the same operations as those of the first embodiment are carried out, and therefore, only the operation which is different from that of the first embodiment will be explained. The mobile terminal 111 explained in the first embodiment fills key word/title in the enquiry frame and transmits the enquiry frame to the exchange 109 through the base station 118. The exchange 109 checks the enquiry frame, recognizes that this is an enquiry by the key word/title, then checks the management table for mobile terminals for managing the positions and key word/title of the mobile terminals under the control of the exchange 109, selects mobile terminals that have the same key word/title as the key word/title under enquiry, and transmits the enquiry frame to the base station that accommodates these mobile terminals. If the mobile terminals having the same key word/title are not listed in the management table for mobile terminals or when a decision has been posted from the enquiry originating terminal 111 that the result of the enquiry by the key word/title under the control of the exchange is sufficient, the exchange 109 makes an access to the management DB 114 for mobile terminals and selects mobile terminals that have the same key word/title as the key word/title enquired and selects a minimum cell that covers the distribution area or a minimum number of cells that cover the distribution area, from the geographical distribution state.

According to the second embodiment, even if the mobile terminals of the enquiry destination are not known, it is possible to manage the mobile terminals by key word/title, specify the mobile terminals to only the mobile terminals relating to the key word/title of the enquiry and recognize their positions, so that it is possible to prevent an increase in the enquiry time without making unnecessary enquiries.

Description will be made of a system operation of a third embodiment according to the present invention where a cell is selected by taking into account the number of mobile terminals of enquiry destinations in addition to the state of distribution of the mobile terminals. Only the operations which are different from those of the first and second embodiments will be explained. When the exchange 109 or 110 for accommodating the enquiry originating terminal 111 or 112 receives an enquiry frame, the exchange 109 or 110 checks the management table for mobile terminals of the exchange 109 or 110 or checks the management DB 114 for mobile terminals, and recognizes the number and the state of distribution of mobile terminals of the enquiry destinations from assigned destinations or from key word/title. When the number of mobile terminals of the enquiry destinations is larger than a threshold value, the exchange 109 or 110 selects cells of a smaller radius rather than a cell which covers the whole distribution area with one cell so that the total number of cells that cover the distribution area is as small as possible.

According to the third embodiment, since the number of mobile terminals of enquiry destinations is taken into account, cells that match their capacity can be selected, and it is also possible to prevent the enquiry and its response processing from affecting other communications than the enquiry, so that an increase in the probability of call loss and an increase in the processing time can be prevented.

A fourth embodiment is a case where a cell is selected by taking into account the distribution density of mobile terminals of enquiry destinations. When mobile terminals of enquiry destinations are located over a wide distribution area, the distribution density of the mobile terminals of the enquiry destination may change greatly within one same area such as when the area includes both the center of a town and its periphery. When the exchange 109 or 110 for accommodating the enquiry originating terminal 111 or 112 receives an enquiry frame, the exchange 109 or 110 checks the management table for mobile terminals of the exchange 109 or 110 or further makes an enquiry to the management DB 114 for mobile terminals, and recognizes the state of distribution of mobile terminals of the enquiry destinations from assigned destinations or from key word/title. When the number of mobile terminals of the enquiry destinations is larger than a threshold value, the exchange 109 or 110 carries out an enquiry with cells of a smaller radius rather than a cell which covers the whole distribution area with one cell for only the area of high distribution density.

According to the fourth embodiment, since cells are selected by taking into account the distribution density of mobile terminals of the enquiry destinations, the processing load applied to the exchanges due to the enquiry can be uniformly dispersed so that an overcrowding to one specific exchange can be avoided.

Figure 2:
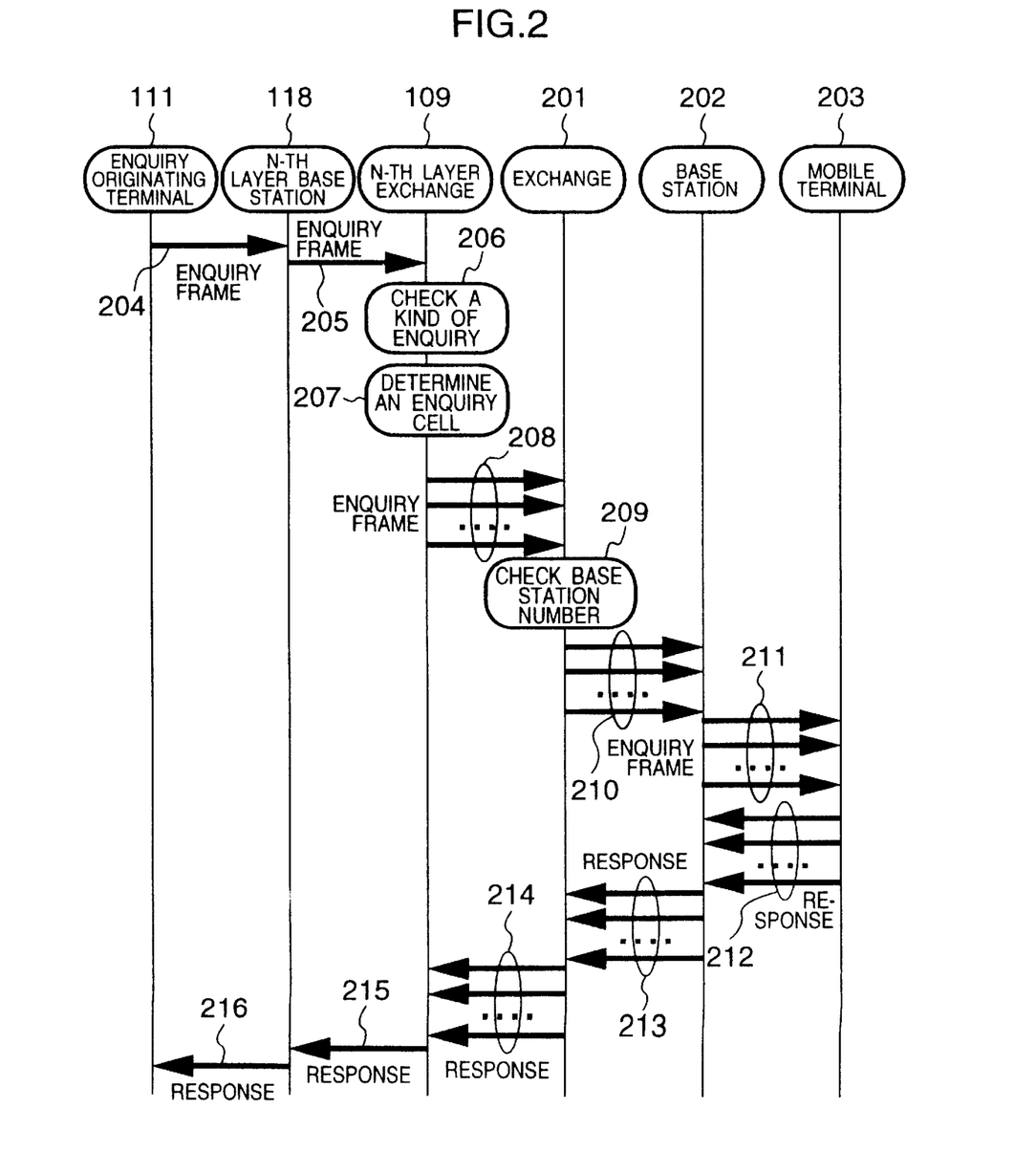
FIG. 2 is a diagram for showing a sequence of enquiry operation by a mobile terminal.

The operation sequence of the enquiry in the first to the fourth embodiments will be explained with reference to FIG. 2.

The enquiry mobile terminal 111 transmits enquiry information with an enquiry frame to the N-th layer exchange 109 through the N-th layer base station 118. At processing 206, the exchange 109 discriminates a kind of the enquiry frame, determines at processing 207 a cell to be enquired from the state of distribution of mobile terminals of enquiry destinations, the number of distribution and the distribution density in the manner as described in the first to the fourth embodiments, fills the number of a base station that forms this cell and the number of an exchange that accommodates this base station in the enquiry frame, and transmits the enquiry frame to a corresponding exchange 201. The exchange 201 checks the number of the base station of the enquiry frame and transmits the enquiry frame to a corresponding base station 202 (at processing 210). The base station transmits the received enquiry frame to the mobile terminals of the destinations (at processing 211). Each mobile terminal 203 checks enquiry destinations and when the mobile terminal confirms that a terminal identification ID of its own terminal is included, the mobile terminal makes a response to the enquiry (at processing 212). The response reaches the exchange 109 in the route opposite to that of the enquiry (at processings 212, 213 and 214). The exchange 109 collects the responses to the enquiry from the mobile terminals, and sends the collected result to the enquiry originating mobile terminal 111 through the base station 118 (at processings 215 and 216). In FIG. 2, when the mobile terminals of the enquiry destinations are the mobile terminals 105 of the first embodiment, the exchange 201 corresponds to the N-th layer exchange 107, the base station 202 corresponds to the N-th layer base station 103 (1), and the mobile terminal 203 corresponds to the mobile terminal 105. When the mobile terminals of the enquiry destinations are the mobile terminals 106 of the first embodiment, the exchange 201 corresponds to the (N+1)-th layer exchange 107, the base station 202 corresponds to the (N+1)-th layer base station 104, and the mobile terminal 203 corresponds to the mobile terminal 106.

Figure 3:
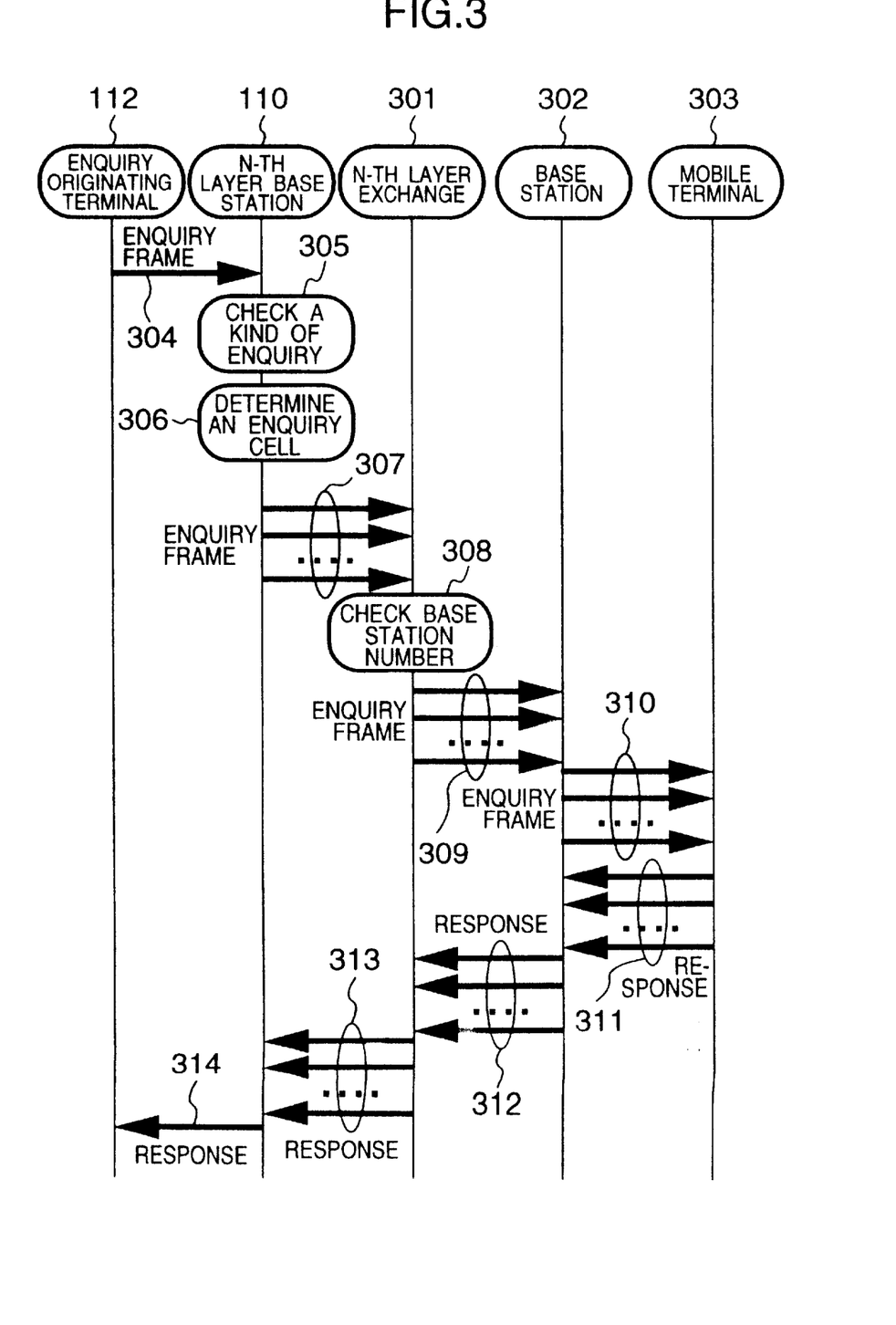
FIG. 3 is a diagram for showing a sequence of enquiry operation by a stationary terminal.

FIG. 3 shows an operation sequence of the case where the enquiry originating terminal is not a mobile terminal but the terminal 112 connected to the telephone network 116 through the exchange 110 in the first to the fourth embodiments. The operation sequence is basically the same as that of FIG. 2, and therefore, the explanation of this operation sequence will be omitted. The only difference is that the enquiry originating terminal 112 transmits the enquiry frame directly to the exchange 110.

Figure 4:
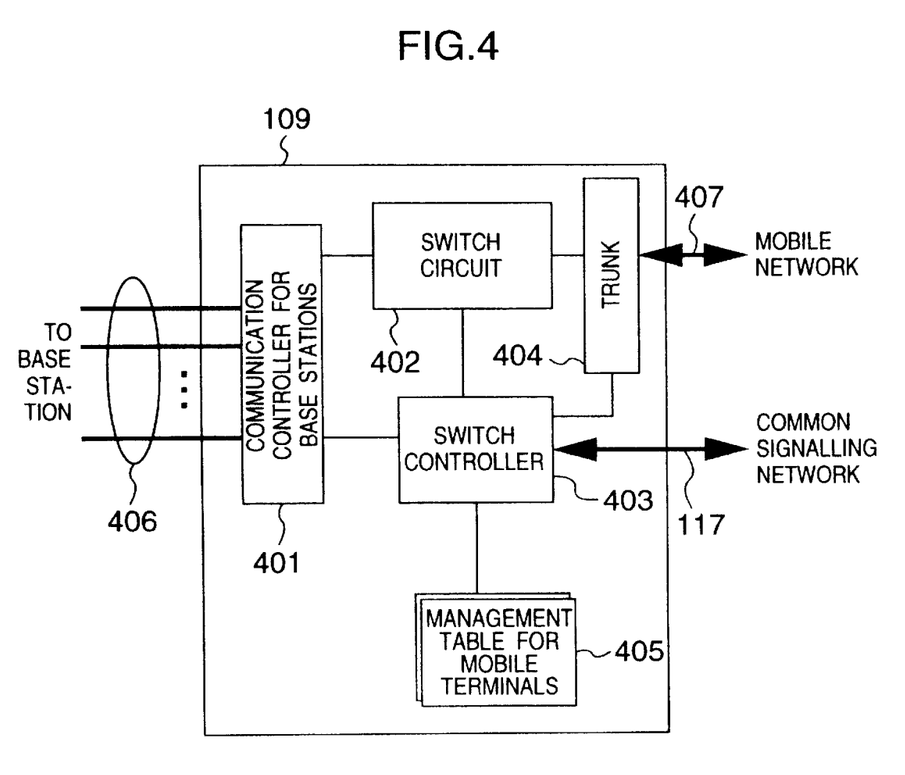
FIG. 4 is block configuration diagram for showing an exchange connected to a mobile network.
Figure 5:
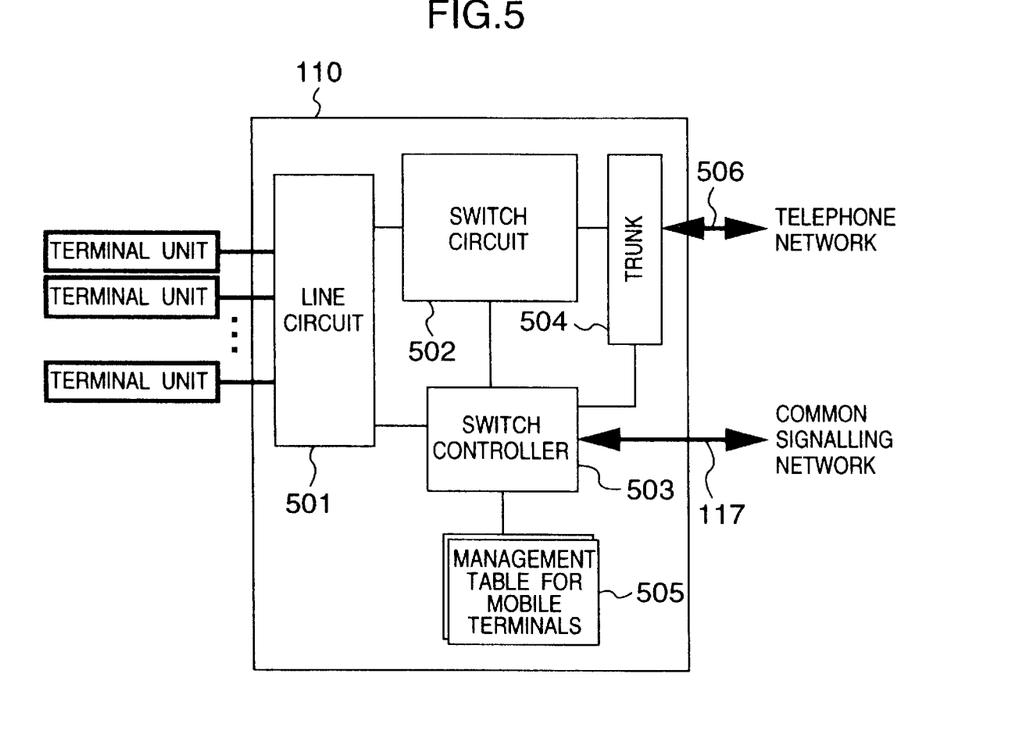
FIG. 5 is block configuration diagram for showing an exchange connected to a telephone network.

FIG. 4 and FIG. 5 show block structure diagrams of an exchange for accommodating the enquiry originating terminal 111 or 112 in the first to the fourth embodiments. When the enquiry originating terminal is the mobile terminal 111, the exchange for accommodating the enquiry originating terminal is the exchange 109 shown in FIG. 4. One of the base stations connected by a circuit 406 to a base-station communication controller 401 for executing a communication control with base stations accommodated therein is the base station 118. When the enquiry originating terminal is the terminal 112, the exchange for accommodating the enquiry originating terminal is the exchange 110 shown in FIG. 5. One of the terminal units connected by a circuit 506 to a line circuit 501 for carrying out a connection between the terminal unit and a switch circuit 502 is the terminal 112. Since the operation of the exchange 109 and the operation of the exchange 110 in the present invention are the same, only the operation of the exchange 109 will be explained with reference to FIG. 4.

In FIG. 4, the exchange 109 is structured by the communication controller 401 for base stations, a switch circuit 402 for connecting a base station circuit 406 by a circuit 407, a switch controller 403 for executing a control and an enquiry operation of the switch circuit 402, a trunk 404 for carrying out a matching of interface between the switch circuit 402 and the circuit 407, and a management table 405 for mobile terminals for managing the positions and key words of mobile terminals accommodated. When the switch controller 403 receives an enquiry frame from the communication controller 401 for base stations, the switch controller 403 fills enquiry addresses and others in the enquiry frame by utilizing the management table 405 for mobile terminals and then transmits the enquiry frame to a common signal line 117.

Figure 6:
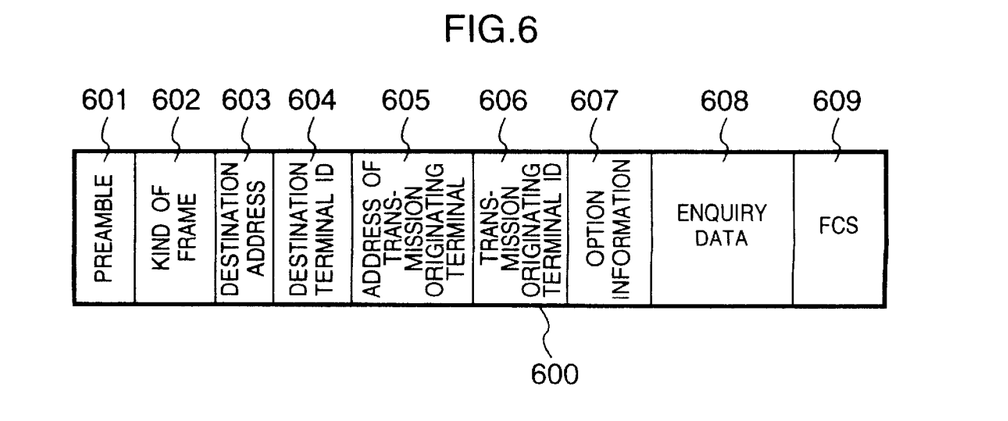
FIG. 6 is a structure diagram of a control frame.

FIG. 6 shows a structure diagram of a control frame 600. The control frame 600 is structured by a preamble 601 for bit synchronization and frame synchronization, a frame code 602 for identification of a kind of frame, a destination address 603 for showing a position of a mobile terminal of a sending destination, a destination terminal ID 604 for identifying the mobile terminal of the sending destination, a transmission originating address 605 for showing the position of a terminal which carries out an enquiry, a transmission originating terminal ID 606 for identifying the terminal which carries out the enquiry, option information 607 for entering key word/title, enquiry data 608 for entering the contents of enquiry, and FCS (Frame Check Sequence) 609 for carrying out a frame error detection. A kind of the control frame is an enquiry frame which is identified by the frame code 602.

Figure 7:
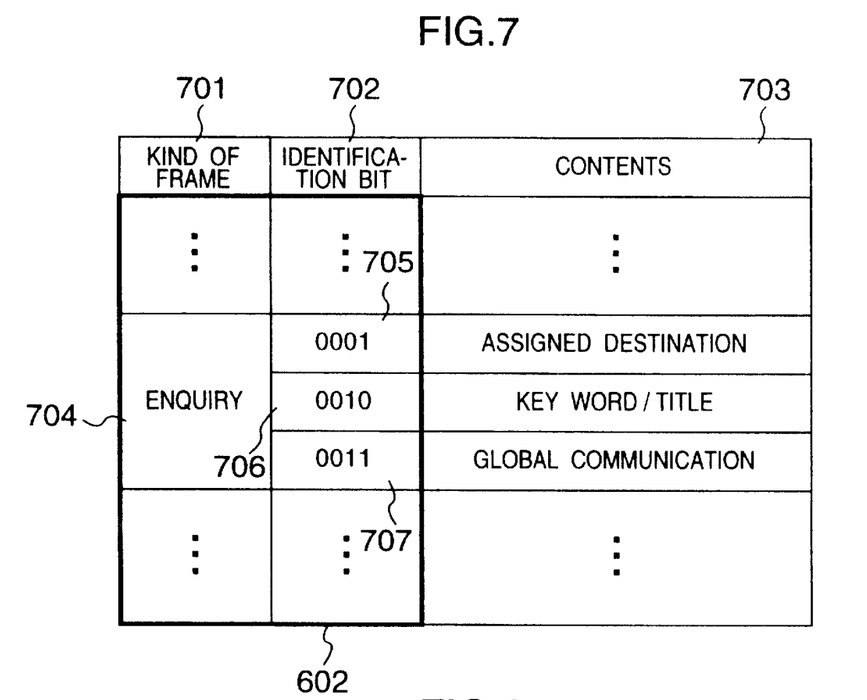
FIG. 7 is a structure diagram of a frame code of a main control frame.

FIG. 7 shows a structure of the frame code 602 of the control frame 600. The frame code 602 is structured by a kind of frame 701 for showing the kind of a frame and an identification bit 702 for showing a using mode of the frame, and an explanation of the using mode is shown in contents 703. An enquiry frame 704 is identified by the kind of frame 701, and an enquiry frame code is entered in this enquiry frame 704. The enquiry frame 704 has three using modes, and the using modes are identified by four bits in this case, as an example. 705 denotes an identification bit {0001} for showing an enquiry based on an assigned destination, 706 denotes an identification bit {0010} for showing an enquiry based on key word/title, and 707 denotes an identification bit {1111} for showing an enquiry based on global communication.

Figure 8:
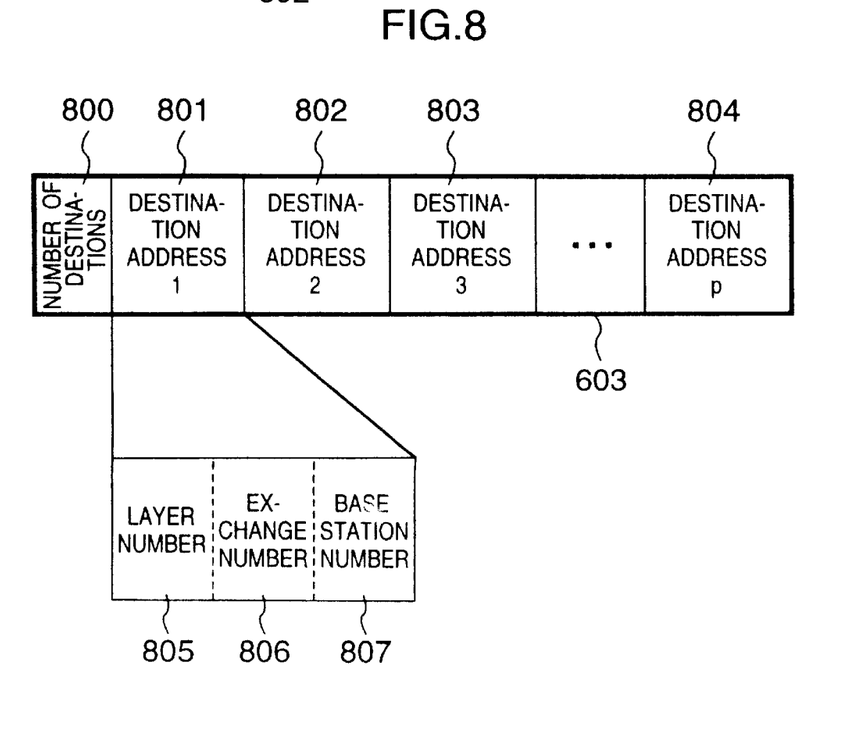
FIG. 8 is a structure diagram of a destination address of the control frame.

FIG. 8 shows a structure of the destination address 603 of the control frame 600. The destination address 603 is structured by a number of addresses 800 and destination addresses 801 to 804 provided by the number of destinations. The number of addresses is counted in unit of each base station. Therefore, mobile terminals of a plurality of enquiry destinations accommodated in one same base station are expressed by one destination address. Each of the destination addresses 801, 802, 803 and 804 is structured by a cell layer number 805, an exchange number 806 and a base station number 807.

Figure 9:
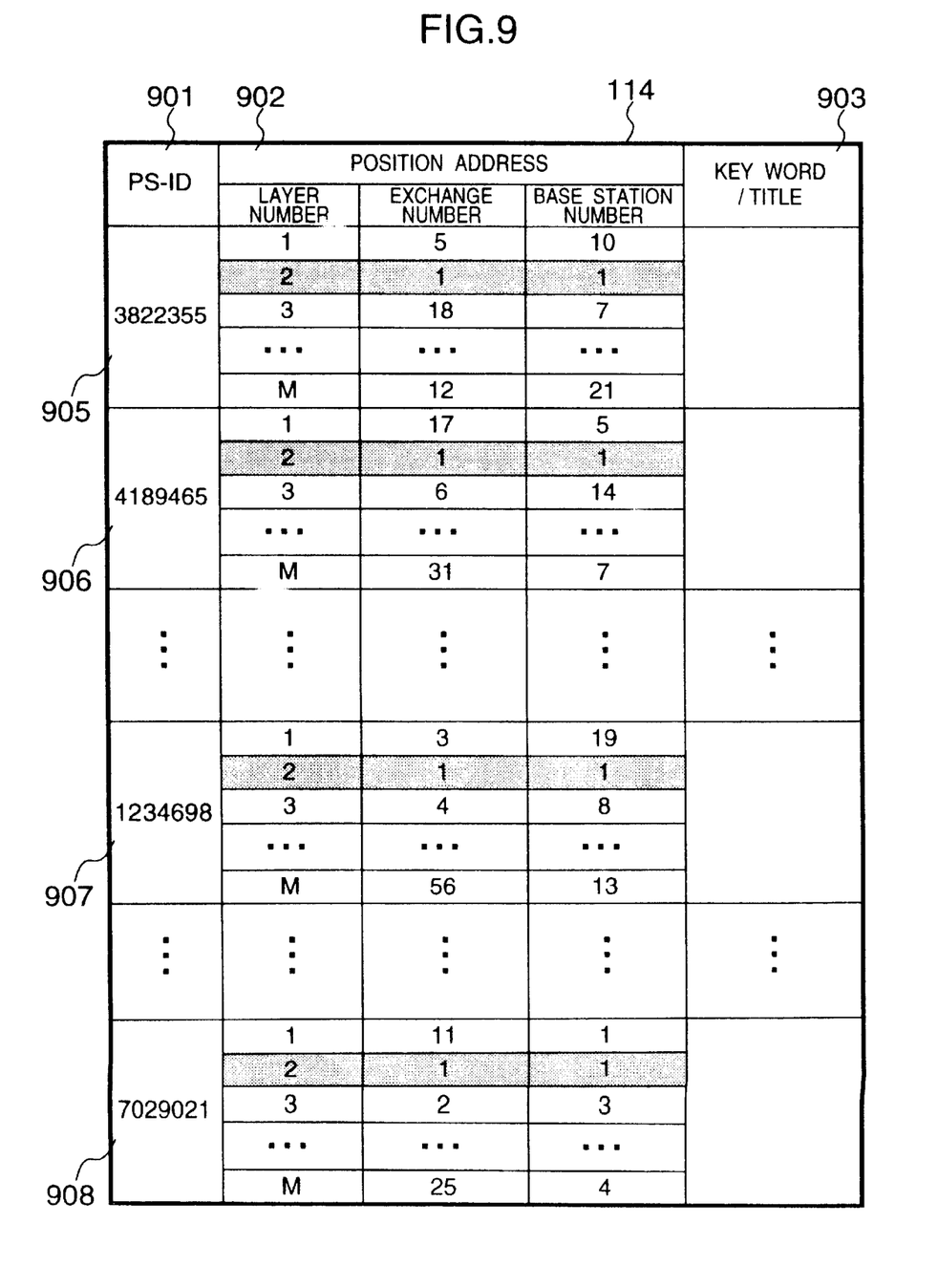
FIG. 9 is a structure diagram of a management table of a management DB (database) for mobile terminals connected to a mobile network.

FIG. 9 is a diagram for explaining the management DB 114 for mobile terminals. Mobile terminals which utilize the mobile network 115 are managed by PS-ID 901 for showing a unique terminal identification number, 902 for showing a position of a mobile terminal and 903 for showing key word/title of information held by the terminal. Since the system used is a mobile radio communication system according to a multi-layer, each mobile terminal has its position address allocated to it for each layer. Since M layers are used for the multi-layer in FIG. 9, M position addresses are given to each one mobile terminal. For example, a mobile terminal 905 of which PS-ID 901 is [3822355] belongs to an address of which exchange number is 5 and base station number is 10 when viewed from layer number 1, and also belongs to an address of which exchange number is 1 and base station number is 1 when viewed from layer number 2.

The management DB 114 for mobile terminals is updated for each exchange connected to the mobile network 115, by the posting from an exchange of a change of position address and a change of key word/title of a mobile terminal whenever a mobile terminal has entered the corresponding exchange from other exchange.

Figure 10:
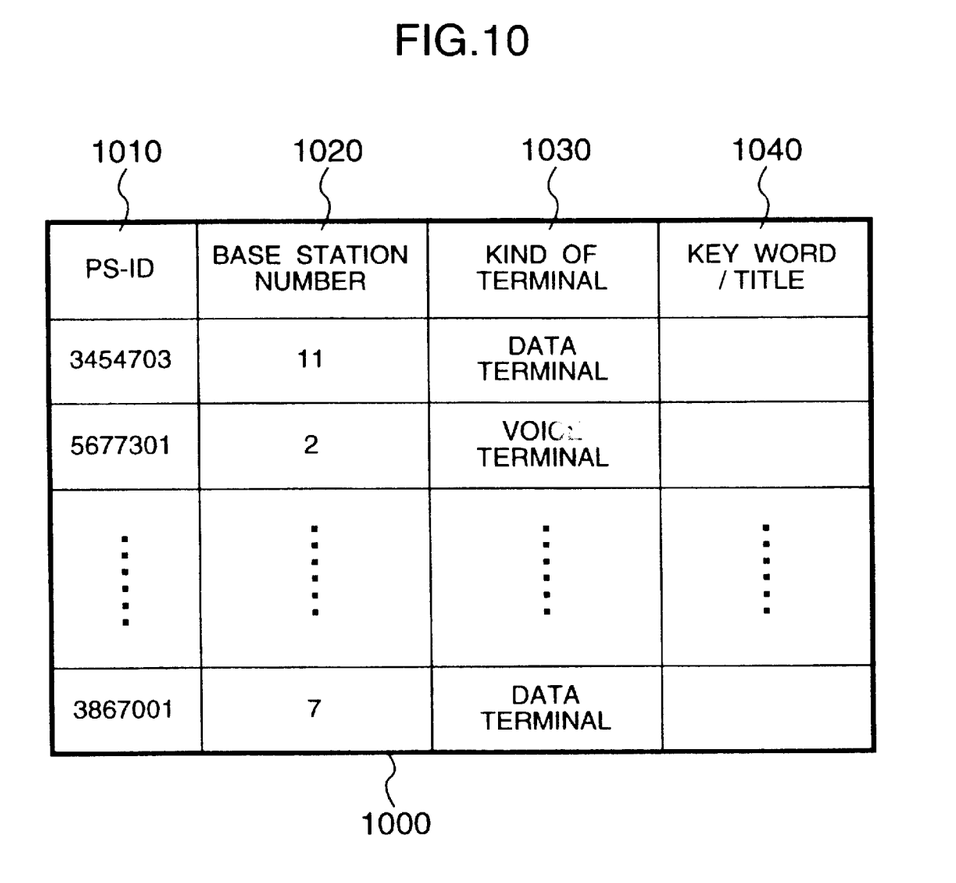
FIG. 10 is a structure diagram of a management table for mobile terminals provided within an exchange.

FIG. 10 shows a management table 1000 for mobile terminals for managing the mobile terminals accommodated in own exchange. The management table 1000 for mobile terminals is connected to the switch controller of the exchange, and corresponds to the management table 405 in case of the exchange 109 and the management table 505 in case of the exchange 110. In FIG. 10, mobile terminals of the mobile network 115 are managed by PS-ID 1010 for showing a unique terminal identification number, a base station number 1020 for identifying a base station to which a mobile terminal belongs, a kind of terminal 1030 for showing a kind of the terminal, and key word/title of information owned by the terminal.

The management table 1000 for mobile terminals is updated by a change of a position address and a change of key word/tile whenever a mobile terminal has entered the exchange from other exchange or a mobile terminal has moved to other exchange.

The processing flow of enquiry of the switch controllers 403 and 503 of the exchanges 109 and 110 for the enquiry originating terminals 111 and 112 for achieving the first to the fourth embodiments will be explained with reference to FIG. 11 by utilizing FIGS. 6 to 10.

Figure 11:
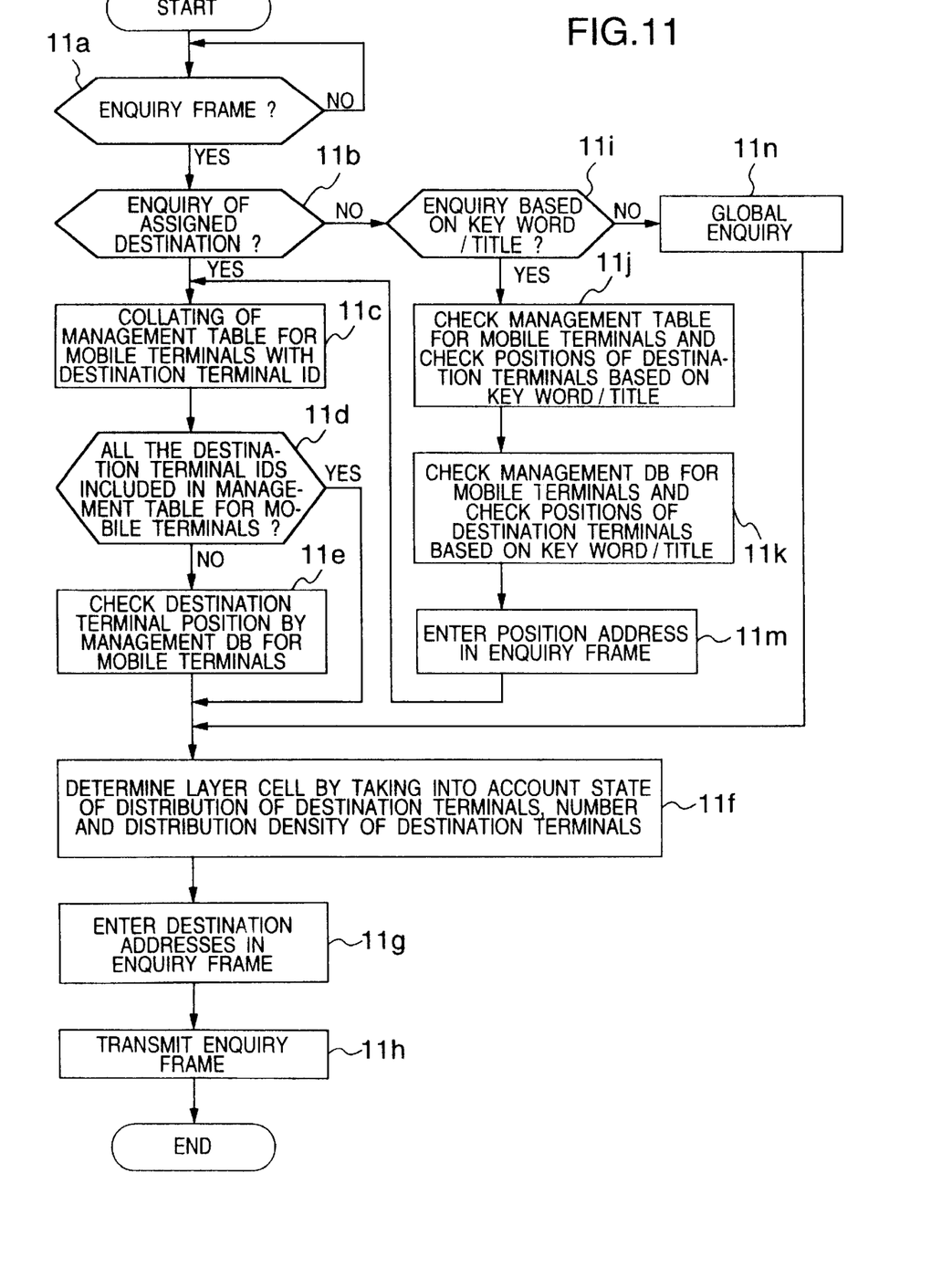
FIG. 11 is a processing flow diagram of an exchange control unit within an exchange for showing one embodiment of the present invention.

Referring to FIG. 11, the kind of frame 701 of the frame code 602 of the control frame 600 that has been received is checked and a decision is made whether this is an enquiry frame or not at step 11a. If the frame is not an enquiry frame, the process goes back to the start. At step 11b, the identification bit 702 of the frame code 602 is checked, and if the using mode of the enquiry frame is an enquiry based on assigned destinations, the process goes to step 11c. When the enquiry is not based on assigned destinations, the process goes to step 11i. At the step 11c, the exchange 109 refers to the PS-ID of the management table 403 for mobile terminals and the destination terminal IDs recorded in the control frame 600, and the exchange 110 refers to the PS-ID of the management table 503 for mobile terminals and the destination terminal IDs recorded in the control frame 600. At step 11d, a decision is made whether all the destination terminal IDs are included in the management table for mobile terminals or not, and if all the destination terminal IDs are included in the management table for mobile terminals, the process goes to step 11f. At step 11e, an access is made to the management DB 114 for mobile terminals, and the position addresses 903 of the mobile terminals of the assigned destinations are enquired and these are obtained. At step 11f, the state of distribution of the mobile terminals of the assigned destinations, the number of the mobile terminals and the distribution density are estimated. The estimation of the distribution state in the management DB 114 for mobile terminals is carried out based on a position address of a layer of the cell with the smallest radius, by specifying the positions of the mobile terminals of the assigned destinations within a range of an error of the radius of the cell. Based on this, the distribution area and the distribution density are estimated. From the result of the estimation obtained, a destination cell to which the enquiry frame is to be transmitted is selected in line with the directions shown in the first to the fourth embodiments. In the case of the global station enquiry, the cell of the layer of the largest cell radius is selected. At step 11g, the base station number, the exchange number and the layer number for forming the destination cell selected, and the base station number of the base station in which the enquiry originating terminal is accommodated, the exchange number and the layer number for the enquiry originating terminal, are entered in the destination address 603 of the enquiry frame and the address 605 of the transmission originating terminal, respectively. At step 11h, the enquiry frame is sent to the corresponding destination exchange.

At step 11i, a decision is made whether the enquiry is based on key word/tile or not, and if the enquiry is not based on key word/title, the process goes to step 11h. At step 11j, the key word/tile recorded in the option information 607 of the enquiry frame is collated with the key word/title 1040 of the management table 1000 for mobile terminals of own station, and mobile terminals having the same key word/title are specified from the management table 1000 for mobile terminals and position addresses of these mobile terminals are obtained. At step 11k, an enquiry is made to the management DB 114 for mobile terminals, and mobile terminals having the same key word/title as the retrieved key word/title of the option information 607 of the enquiry frame are specified so that the position addresses of these mobile terminals are obtained. At step 11m, the position addresses obtained at the step 11j and the step 11k are entered in the destination terminal IDs 604 of the enquiry frame, and then the process goes to step 11c.

At step 11n, the destination addresses for global station enquiry are entered in the enquiry frame, and then the process goes to step 11f.

A cell selection method in the first embodiment which becomes the basis of the present embodiment will be explained in detail with reference to FIG. 9. In FIG. 9, it is assumed that the enquiry destinations are the mobile terminals which are expressed by the PS-ID of 905, 906 and 907. Each of these mobile terminals has N position addresses for each cell layer. These three terminals have common position addresses in layer 2 which is shaded. In other words, when the layer number is set to 2, the exchange number is set 1 and the base station number is set to 1 to specify the destination address of the cell to be selected, it is possible to carry out the enquiry with a minimum of one cell.

According to the present invention, it is possible to realize one-to-N communications in short time by selecting a minimum cell which can cover a distribution area or a minimum number of cells that can cover a distribution area, based on a status of geographical distribution of a plurality of mobile terminals to be communicated with, by utilizing a multiple address of radio communications. Further, the number of base stations and exchanges relating to the communication can be restricted, so that the traffic quantity relating to the transmission processing to the public network can be restricted. Further, when mobile terminals to be communicated with are not known, only the relevant terminals can be limited by managing information of the corresponding terminals so that their positions can be made firm, to thereby enable achieving a reduction in the time required for one-to-N communications, without involving unnecessary communications. Further, since the number of mobile terminals to be communicated with can be taken into account, a cell which matches the capacity can be selected and an influence to communications other than one-to-N communications can be restricted such as, for example, a reduction in the quality of services due to an increase in the probability of call loss can be prevented. Moreover, since a cell is selected by taking into account the distribution density of the mobile terminals to be communicated with, the load of communication processing applied to related exchanges can be dispersed uniformly so that an occurrence of overcrowding to a specific exchange can be avoided.

What is claimed is:

1. A mobile radio communication system structured by multi-layer cells which are cells formed by base stations structured in layers, comprising:

a call originating terminal for carrying out one-to-N communications with a plurality of mobile terminals accommodated in any one of cells of said multi-layer cells;

a first exchange for accommodating said call originating terminal;

at least one base station for accommodating said plurality of mobile terminals to be communicated with;

a second exchange for accommodating said base station;

a mobile terminal managing unit for managing position information of said plurality of terminals to be accommodated in at least one of said multi-layer cells; and a mobile network for connecting said first exchange, said second exchange and said mobile terminal managing unit, wherein said first exchange receives an enquiry frame transmitted from said call originating terminal, specifies a plurality of mobile terminals to be communicated with based on said enquiry frame, makes an enquiry about positions of said specified plurality of mobile terminals to said mobile terminal managing unit through said mobile network, and selects at least one exchange and at least one base station forming the multi-layer cell in the size for coping with said specified plurality of mobile terminals according to a result of said enquiry.

2. A mobile radio communication system according to claim 1, wherein said call originating terminal is a mobile terminal.

3. A mobile radio communication system according to claim 1, wherein said mobile terminal managing unit manages an identification number and a position address of each of said mobile terminals.

4. A mobile radio communication system according to claim 3, wherein said position address to be managed by said mobile terminal managing unit manages, for each of said mobile terminals, layer data for showing a layer of said multi-layer, data for specifying a base station for accommodating said mobile terminal and data for specifying an exchange for accommodating said base station for accommodating said mobile terminal.

5. A mobile radio communication system according to claim 1, wherein said first exchange receives an enquiry frame transmitted from said call originating terminal, specifies a plurality of mobile terminals to be communicated with based on said enquiry frame, makes an enquiry about positions of said specified plurality of mobile terminals to said mobile terminal managing unit through said mobile network, understands a size of a distribution area of said plurality of mobile terminals to be communicated with from a result of said enquiry, and selects at least one exchange and at least one base station for accommodating said specified plurality of mobile terminals according to a result of said understanding.

6. A mobile radio communication system according to claim 1, wherein said first exchange receives an enquiry frame transmitted from said call originating terminal, specifies a plurality of mobile terminals to be communicated with based on said enquiry frame, makes an enquiry about positions of said specified plurality of mobile terminals to said mobile terminal managing unit through said mobile network, and selects said base stations for structuring a smallest number of cells necessary to cover a distribution area of said plurality of mobile terminals from a result of said enquiry.

7. A mobile radio communication system structured by multi-layer cells which are cells formed by base stations structured in layers, comprising:

a call originating terminal for carrying out one-to-N communications with a plurality of mobile terminals accommodated in any one of cells of said multi-layer cells;

a first exchange for accommodating said call originating terminal;

at least one base station for accommodating said plurality of mobile terminals to be communicated with;

a second exchange for accommodating said base station;

a mobile terminal managing unit for managing position information of said plurality of terminals to be accommodated in at least one of said multi-layer cells; and a mobile network for connecting said first exchange, said second exchange and said mobile terminal managing unit, wherein said first exchange receives an enquiry frame transmitted from said call originating terminal, specifies a plurality of mobile terminals to be communicated with based on said enquiry frame, makes an enquiry about positions of said specified plurality of mobile terminals to said mobile terminal managing unit through said mobile network, understands a distribution area of said specified plurality of mobile terminals according to a result of said enquiry, and selects exchanges and base stations for forming smaller cells rather than selecting one cell which covers a whole of said distribution area of said plurality of mobile terminals.

8. A mobile radio communication system according to claim 7, wherein said call originating terminal is a mobile terminal.

9. A mobile radio communication system according to claim 7, wherein said mobile terminal managing unit manages an identification number and a position address of each of said mobile terminals.

10. A mobile radio communication system according to claim 9, wherein said position address to be managed by said mobile terminal managing unit manages, for each of said mobile terminals, layer data for showing a layer of said multi-layer, data for specifying a base station for accommodating said mobile terminal and data for specifying an exchange for accommodating said base station for accommodating said mobile terminal.

11. A mobile radio communication system according to claim 7, wherein said first exchange receives an enquiry frame transmitted from said call originating terminal, specifies a plurality of mobile terminals to be communicated with based on said enquiry frame, makes an enquiry about positions of said specified plurality of mobile terminals to said mobile terminal managing unit through said mobile network, understands a distribution area of said specified plurality of mobile terminals according to a result of said enquiry, and selects said exchange and said base station according to said distribution of said plurality of mobile terminals.

12. A mobile radio communication system according to claim 7, wherein said first exchange selects base stations for forming smaller cells rather than one cell which covers a whole of a distribution area in one cell for an area of which distribution density is high within a distribution range of said mobile terminals to be communicated with said call originating terminal.

13. A mobile radio communication system structured by multi-layer cells which are cells formed by base stations structured in layers, comprising:

a call originating terminal for carrying out one-to-N communications with a plurality of mobile terminals accommodated in any one of cells of said multi-layer cells;

a first exchange for accommodating said call originating terminal;

at least one base station for accommodating said plurality of mobile terminals to be communicated with;

a second exchange for accommodating said base station;

a mobile terminal managing unit for managing position information of said plurality of terminals to be accommodated in at least one of said multi-layer cells; and a mobile network for connecting said first exchange, said second exchange and said mobile terminal managing unit, wherein said first exchange receives an enquiry frame transmitted from said call originating terminal, specifies a plurality of mobile terminals to be communicated with based on said enquiry frame, makes an enquiry about positions of said specified plurality of mobile terminals to said mobile terminal managing unit through said mobile network, selects at least one exchange and at least one switch for accommodating said specified plurality of mobile terminals according to a result of said enquiry, adds data of said base station for forming a cell which covers said plurality of mobile terminals to be communicated with, data of said exchange for accommodating said base station and data of a cell layer to said enquiry frame, and transmits said enquiry frame to said mobile network.

14. A mobile radio communication system according to claim 13, wherein said call originating terminal is a mobile terminal.

15. A mobile radio communication system according to claim 13, wherein said mobile terminal managing unit manages an identification number and a position address of each of said mobile terminals.

16. A mobile radio communication system according to claim 15, wherein said position address to be managed by said mobile terminal managing unit manages, for each of said mobile terminals, layer data for showing a layer of said multi-layer, data for specifying a base station for accommodating said mobile terminal and data for specifying an exchange for accommodating said base station for accommodating said mobile terminal.

17. A mobile radio communication system according to claim 13, wherein said first exchange selects base stations for forming smaller cells rather than one cell which covers a whole of a distribution area in one cell for an area of which distribution density is high within a distribution range of said mobile terminals to be communicated with said call originating terminal.

18. A mobile radio communication system, including: a call originating terminal for carrying out one-to-N communications with a plurality of mobile terminals accommodated in any one of cells of multi-layer cells which are cells formed by base stations structured in layers; a first exchange for accommodating said call originating terminal; at least one base station for accommodating said plurality of mobile terminals to be communicated with; a second exchange for accommodating said base station; a mobile terminal managing unit for managing position information of said plurality of terminals to be accommodated in at least one of said multi-layer cells; and a mobile network for connecting said first exchange, said second exchange and said mobile terminal managing unit, wherein said first exchange receives an enquiry frame transmitted from said call originating terminal, specifies a plurality of mobile terminals to be communicated with based on said enquiry frame, makes an enquiry about positions of said specified plurality of mobile terminals to said mobile terminal managing unit through said mobile network, and selects at least one exchange and at least one base station forming the multi-layer cell in the size for coping with said specified plurality of mobile terminals according to a result of said enquiry.

19. A mobile radio communication system according to claim 18, wherein said first exchange receives an enquiry frame transmitted from said call originating terminal, specifies a plurality of mobile terminals to be communicated with based on said enquiry frame, makes an enquiry about positions of said specified plurality of mobile terminals to said mobile terminal managing unit through said mobile network, understands a size of a distribution area of said plurality of mobile terminals to be communicated with from a result of said enquiry, and selects at least one exchange and at least one base station for accommodating said specified plurality of mobile terminals according to a result of said understanding.

20. A mobile radio communication system according to claim 18, wherein said first exchange receives an enquiry frame transmitted from said call originating terminal, specifies a plurality of mobile terminals to be communicated with based on said enquiry frame, makes an enquiry about positions of said specified plurality of mobile terminals to said mobile terminal managing unit through said mobile network, and selects said base stations for structuring a smallest number of cells necessary to cover a distribution area of said plurality of mobile terminals from a result of said enquiry.

21. A mobile communication system, comprising:

a mobile network of multiple exchange units supporting multi-layer cells of a plurality of mobile terminals for point to multi-point communications, and a mobile terminal managing unit for managing said plurality of mobile terminals to be accommodated in at least one of said multi-layer cells; and at least one exchange unit arranged to receive an enquiry frame transmitted from a call originating terminal, specify a plurality of mobile terminals for communications based on said enquiry frame, determine a size of a distribution area of said plurality of mobile terminals specified, and select at least one base station and an exchange unit for accommodating said plurality of mobile terminals specified in accordance with the size of the distribution area.

22. A mobile communication system according to claim 21, wherein said call originating terminal is a mobile terminal.

23. A mobile communication system according to claim 21, wherein said mobile terminal managing unit manages an identification number and a position address of each of said mobile terminals.

24. A mobile radio communication system according to claim 23, wherein said position address to be managed by said mobile terminal managing unit for accommodating each of said mobile terminals contains layer data for showing a layer of said multi-layer cells, data for specifying a base station for accommodating said mobile terminals and data for specifying an exchange for accommodating said base station.

25. A mobile radio communication system according to claim 21, wherein said at least one exchange unit further selects at least one base station for forming smaller cells rather than one cell which covers an entire of a distribution area in one cell for an area of which a distribution density is high within a distribution range of said mobile terminals to be communicated with said call originating terminal.

* * * * *